April 4, 1944.     F. G. DU PONT ET AL     2,345,867
GAUGING DEVICE
Filed Oct. 31, 1942     2 Sheets-Sheet 1
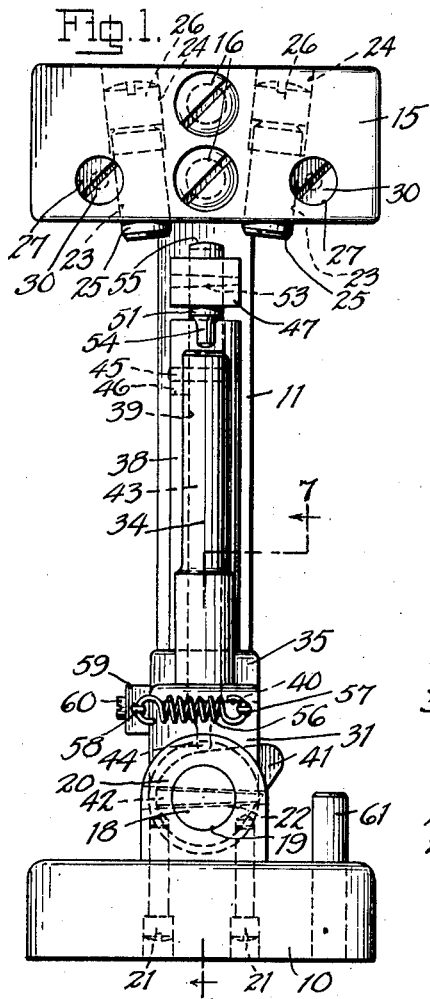
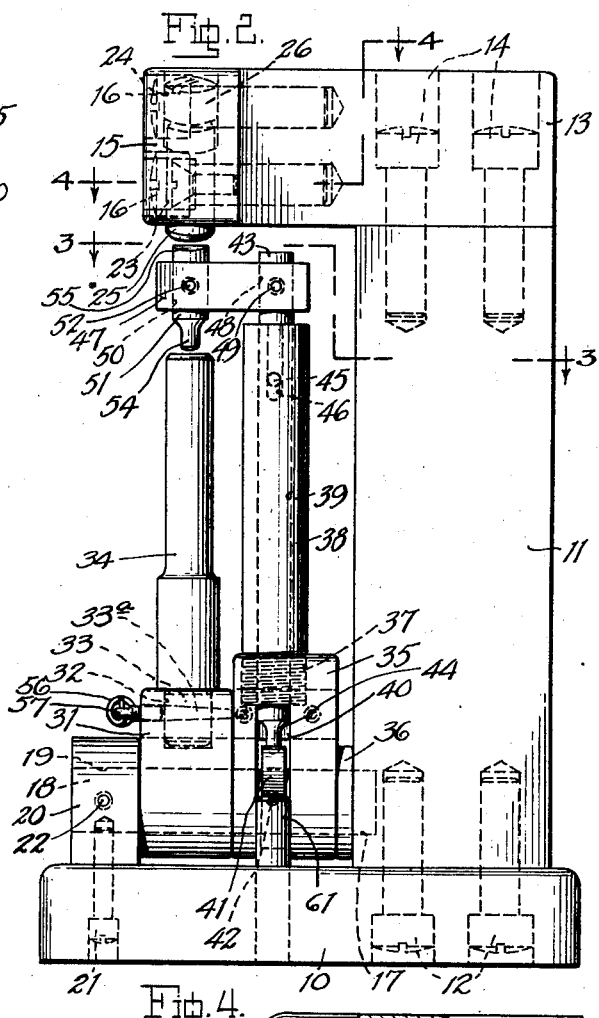
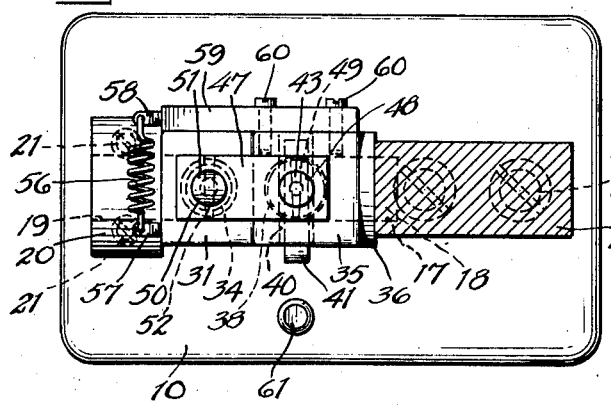
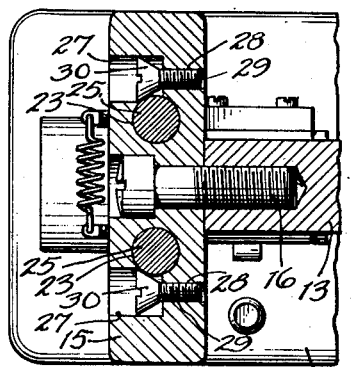
INVENTORS
FRANCIS G. DuPONT
LUTHER V. BARKER
BY
D. Verner Smythe
ATTORNEYS April 4, 1944.  F. G. DU PONT ET AL  2,345,867
GAUGING DEVICE
Filed Oct. 31, 1942  2 Sheets-Sheet 2
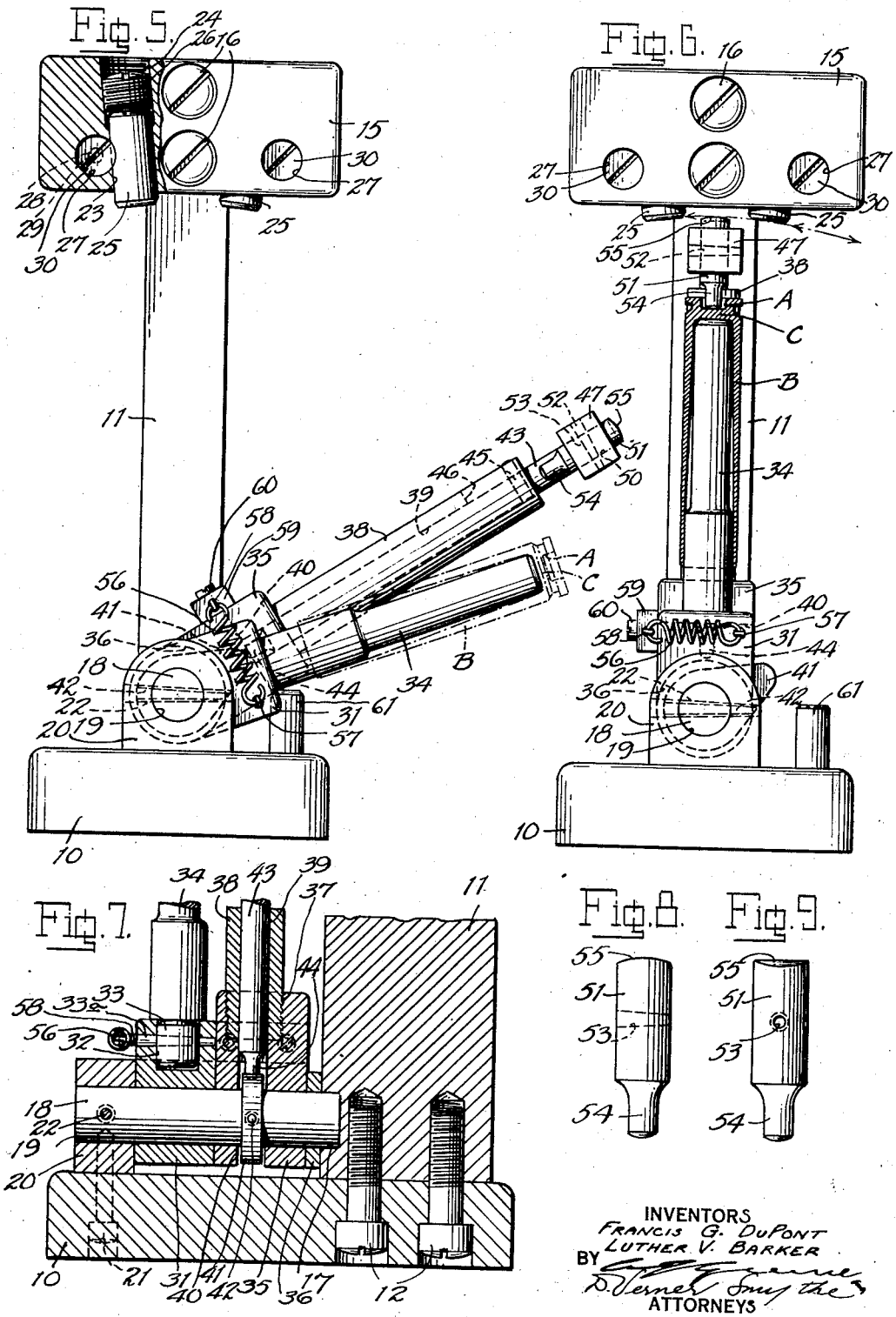
INVENTORS
FRANCIS G. DuPONT
LUTHER V. BARKER
BY
D. Verner Smythe
ATTORNEYS Patented Apr. 4, 1944

2,345,867

UNITED STATES PATENT OFFICE 2,345,867

GAUGING DEVICE

Francis G. du Pont and Luther V. Barker, Denver, Colo., assignors to Remington Arms Company, Inc., Bridgeport, Conn., a corporation of Delaware Application October 31, 1942, Serial No. 464,046

12 Claims. (Cl. 33—143)

The present invention relates to a thickness gauge, particularly for gauging the thickness of the end wall of a cup-shaped article, as for instance, the web in the base of the primer cap pocket in the head end of a cartridge case, or the thickness of such head end in various stages of manufacture of the cartridge case. Heretofore, the gauging of web thickness has for the most part been done by means of a dial indicator type of gauge, which requires that a small cylindrical insert be placed in the primer cap pocket and thereupon swung under the indicator stem of the gauge. This was a slow procedure, the cylindrical inserts were readily and often lost, and the accuracy of the gauging operation depended upon the skill of the operator in making a reading of the dial indicator, with the result that the gauging was time-consuming, costly, and subject to error.

It is an object of the present invention to provide a thickness gauge by which the gauging operation may be carried out with speed and extreme accuracy, and which will positively indicate by means of "go" and "no go" gauge means whether or not the thickness of the part being gauged is within the permissible limits, this operation being an automatic function of the device and therefore not depending upon the skill of the operator for accuracy.

A further object is to provide a gauge device having an article supporting anvil for contacting the inner side of the web or head portion to be gauged, and an anvil for engaging the outer side in axially aligned relation with the article supporting anvil, the outer anvil being movable axially into and out of engagement with the article through swinging movement of the article into and out of gauging position, whereby the engagement of the anvil members with the article is an automatic function of the device and does not depend upon the skill of the operator, at the same time greatly facilitating and speeding up the operation of engaging and disengaging the articles.

A further object is to provide a gauging device wherein the article supporting anvil is adapted to be swung into an angular position with respect to the cooperating outer anvil member, to provide a clear space axially beyond the end of the article supporting anvil, so that the article may be readily engaged therewith or disengaged therefrom by movement longitudinally of the axis of the supporting anvil.

With the above and other objects in view an embodiment of the invention is shown in the accompanying drawings, and this embodiment will be hereinafter more fully described with reference thereto, and the invention will be finally pointed out in the claims.

In the drawings:

Fig. 1 is an end elevation of the gauge device according to the illustrated exemplary embodiment of the invention, the parts being shown, without a cartridge case in place, in an intermediate vertical position between the "go" and "no go" gauge means.

Fig. 2 is a front elevation, with the parts in the same vertical position as shown in Fig. 1.

Fig. 3 is a horizontal sectional plan view, taken along the line 3—3 of Fig. 2.

Fig. 4 is a fragmentary horizontal sectional flat view, taken along the line 4—4 of Fig. 2.

Fig. 5 is an end elevation showing the gauge in open cartridge case removal or engaging position, the supporting anvil member being swung to an angular position with respect to the co-operating outer anvil member for the purpose of removing or engaging a cartridge case, the cartridge case being shown in dot-and-dash lines in position on the supporting anvil.

Fig. 6 is an end elevation, showing a cartridge case in place in the device, and the parts in an intermediate vertical position between the "go" and "no go" gauge means.

Fig. 7 is a fragmentary vertical sectional view, taken along the line 7—7 of Fig. 1.

Fig. 8 is an enlarged detail side elevation of the outer anvil member employed in the illustrated embodiment of the invention.

Fig. 9 is a front elevation thereof.

Similar reference characters indicate corresponding parts throughout the several figures of the drawings.

Referring to the drawings, the thickness gauge, according to the illustrated exemplary embodiment of the invention, comprises a frame consisting of a horizontal rectangular base member 10, a vertical spacer member 11, of rectangular cross-section, secured centrally upon the rearward portion of the upper face of the base member 10 by means of bolts 12—12, a bracket member 13 of rectangular cross-section, and preferably of corresponding thickness to the spacer member 11, secured to the upper end thereof by means of bolts 14—14 and projecting forwardly therefrom, and a cross-head jaw member 15 secured to the forward end of the bracket member 13 by means of bolts 16—16 and projecting at each side thereof.

Centrally of the forward side of the spacer member 11 near its lower end there is provided a cylindrical pocket 17 in which one end of an arbor shaft 18 is supported, the other end of this shaft being supported in the cylindrical passage 19 of a supporting block 20 secured centrally near the forward end of the base member 10 by means of bolts 21—21, the arbor shaft being fixed against rotary and longitudinal movement by means of a taper pin 22 engaged through the block 20 and the shaft end supported therein. Upon this arbor shaft are rotatably supported the cartridge case supporting and gauging anvils, as will presently more fully appear.

The cross-head jaw member 15 is provided, in equally spaced relation at each side of its vertical central plane coincident with the axis of the arbor shaft 18, with downwardly converging cylindrical passages 23—23 having threaded portions 24—24 at their upper ends, the axes of these passages being along radial lines extending through the axis of the arbor shaft. Within the passages 23—23 there are adjustably engaged cylindrical gauge elements 25—25 projecting downwardly from the under side of the cross-head jaw member 15, and adjustably fixed by means of adjusting screws 26 engaged in the threaded pockets 24 of the passages and bearing upon the upper ends of the gauge elements, these screws adapted to prevent upward displacement of the gauge elements and by turning to adjust the extent of their projection.

For the purpose of fixing the gauge elements against downward displacement there is provided at the outer side of each of the passages 23—23 a cylindrical pocket 27, the circumference of which overlaps the circumference of the passage, there being a threaded screw-hole 28 in the base of the pocket 27 extending to the rearward side of the cross-head jaw. A retaining wedge screw 29 is engaged in the threaded passage 28 and is provided with a conically tapered head 30 fitting within the pocket 27, the conical surface of the head at one point in the adjustment of the screw bearing in wedging engagement against the cylindrical surface of the gauge element 25, and thereby retaining it against downward displacement. During adjustment of the gauge element the wedge screw is withdrawn from engagement therewith, thus permitting the gauge element to be downwardly adjusted by screwing down the screw 26, or upwardly adjusted by pressing it upwardly in the passage 23, the screw 26 at the same time being screwed upwardly.

The gauge element 25 at the right, as shown in Fig. 1, constitutes a "go" gauge, and thus its adjustment is such that the cartridge case carrying anvil structure hingedly mounted upon the arbor shaft may clear this gauge as it is swung beneath it, while the gauge element at the left constitutes a "no go" gauge, being adjusted downwardly to a point where the cartridge carrying anvil structure that clears the "go" gauge will not clear the "no go" gauge, if the proper thickness article is in place. In the case of a cartridge case in which thickness being gauged is oversize, the anvil structure will not swing beneath the "go" gauge at the right, and hence the cartridge case is indicated as imperfect. In the case of the thickness being undersize, the anvil structure will swing beneath the "no go" gauge at the left, indicating that the cartridge is imperfect. Inasmuch as the "go" and "no go" gauge elements may be very finely adjusted, so that the difference in projection is extremely slight, the gauging may be carried out with extreme accuracy and within the very smallest tolerance limits.

Upon the arbor shaft 18 there are rotatably supported the supporting anvil means adapted to engage within and support the cartridge case, and the cooperating axially movable outer anvil means. The cartridge case supporting anvil comprises a hinge base member 31 rotatably mounted upon the arbor shaft adjacent the bearing block 20 and having in its upper flat surfaces end a cylindrical pocket 32 in which is engaged the reduced diameter cylindrical stud end 33 of the cartridge case supporting anvil member 34, the anvil being secured at each side to the hinge base member by means of a taper pin 33ᵃ engaged through the hinge member and the stud end 33. The diameter, length, and shape of the anvil member 34 may be of any suitable dimensions and design to have the cartridge case or other article to be gauged fitted thereon with a slit fit, and with the end of the anvil firmly engaged with the inner side of the transverse web or head end of the cartridge case or other article.

The axially movable outer anvil member is rotatably mounted upon the arbor shaft adjacent the hinge base member 31, and comprises a hinge base member 35 engaged with the hinge base member 31 at one side and engaged at the other side with a spacing washer 36 disposed on the arbor shaft adjacent the spacer member 11. The base member 35 has its flat surfaced upper end extended to a higher point than the upper end of the base member 31, and is provided with a threaded pocket 37 in which is screwed the lower end of a tubular support arm 38, the cylindrical passage 39 through this arm extending at its lower end to a cut-out slot 40 in the base member, within which slot is disposed a fixed cam member 41, secured upon the arbor shaft by means of a taper pin 42. This cam is adapted, as will presently more fully appear, to affect the axial engaging and disengaging movement of the cartridge case engaging outer anvil member.

Within the passage 39 there is slidably engaged a lift rod 43 provided at its lower end projecting into the slot 40 with a cam-engaging tip portion 44, the lift rod being retained against turning movement by means of a pin 45 secured therein and engaged in a vertical slot 46 at the upper end of the arm 38. The lift rod 43 has supported upon its upper end above the upper end of the arm 38 an outer or top anvil carrier bar 47, this bar being provided with a vertical cylindrical passage 48 in which the rod is engaged and being secured to the rod by means of a taper pin 49 extending through the bar and rod. This bar projects transversely over the end of the article supporting anvil 34 and is provided in axial alignment therewith with a cylindrical passage 50, the axis of which is in the vertical plane of swing of the axis of the anvil member 34, as well as the vertical plane passing through the axes of the "go" and "no go" gauge elements 25—25.

Within the passage 50 there is engaged the cylindrical outside or upper anvil member 51 rigidly secured to the bar 47 by a taper pin 52 engaged through the bar and through a tapered hole 53 in the anvil member. The anvil member 51 is provided at its lower end with an article engaging formation 54, shown in the illustration as a reduced diameter round-ended stem portion, and which is suitably designed for the particular gauge work contemplated, the stem portion in this case being adapted to fit within the primer cap pocket A of the cartridge case B to gauge the thickness of the web C forming the bottom of the pocket A and separating the interior of the case from the pocket. The upper end of the anvil member 51 is cylindrically curved convexly, as at 55, and adapted to swing in relation to the "go" and "no go" gauge elements 25—25 as shown by the arrow line in Fig. 6.

It will be understood that for other gauging operations, as for instance the gauging of the thickness of the bumped up or the flattened head of the cartridge case, top anvil members of suitable form for these operations will be provided, these interchangeable anvils being readily engaged and disengaged by means of the taper pin 52. The inside or lower cartridge case supporting anvil member 34 may also be substituted by lower anvils of any suitable diameter, length, or shape to fit the particular article being gauged, these lower anvils being readily engaged and disengaged by means of the taper pin 33a.

The lower article supporting anvil and the axially movable upper anvil and their respective hinge base supports are normally axially aligned and swing as a unit upon the arbor shaft 18, and for this purpose they are yieldably tied together by means of a spring 56 connected at one end to an eyelet screw 57 secured in the end of the hinge base member 31 and connected at its other end to an eyelet screw 58 secured in the end of a stop arm 59 extending across the rearward faces of the hinge base members 31 and 35, and secured to the latter by means of screws 60—60. This springs connection draws and yielding retains the hinge base members into aligned position, but allows the lower anvil member to be swung to an angular open position with respect to the upper anvil member, as shown in Fig. 5, for the purpose of clearing the end of the lower anvil member to permit the free axial engagement of a cartridge case with the anvil member and its ready removal therefrom.

In the open position the forward swinging movement of the hinge base 35 is stopped by engagement with a stop pin 61 secured in the base member 10, the cartridge case supporting anvil being depressible from this position to its open position, as shown in Fig. 5, and adapted to automatically return to aligned position through the action of the spring 56. In moving to this open position, the rod 43 is projected by means of the cam 41, causing the upper anvil member 51 to be lifted from the cartridge case pocket A entirely clear of the head end of the cartridge case, thus releasing the latter so that the lower anvil member may be readily swung down into the open position for the removal of the cartridge case therefrom, and the placing of another one thereon, and will then swing upwardly into aligned position with the upper anvil member through the action of the spring. Thereupon, as the swinging parts are swung upwardly into gauging relation, the rod 43 moves downwardly along the cam 41, automatically lowering the stem 54 of the upper anvil member into the pocket A of the cartridge case, the lower end of the rod moving clear of the cam before the "go" gauge element 25 is reached, so that the upper anvil member engages the web C under the weight of the rod 43, thus providing a firm engaging contact by gradual lowering of the anvil member into engagement with the web surface, and without the chance of indenting the cartridge case, as might occur if the upper anvil is allowed to drop into engagement or is forcefully pulled into engagement by spring action.

In Fig. 6 the gauge is illustrated with a cartridge case having the proper web dimension in place, the upper end 55 of the upper anvil 51 being shown by the arrow as having passed beneath the "go" gauge element and being prevented from passing the "no go" gauge element. In the case of an oversize web, the anvil 51 would not pass the "go" gauge element, and the cartridge case would thereupon be removed and rejected. In the case of an undersize web, the anvil 51 would swing freely beneath both the "go" and "no go" gauge elements, and the cartridge case would thereupon be removed and rejected.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a thickness gauge, a support, an article supporting anvil member rotatably mounted at one end upon said support for swinging movement, an arm member rotatably mounted upon said support coaxially with said anvil member for swinging movement therewith, a second anvil member disposed radially relative to said first anvil member and movably carried by said arm member for relative radial movement thereto, and gauge means carried by said support in contiguous relation to the path of swinging movement of said second anvil member.

2. In a thickness gauge, a support, an article supporting anvil member rotatably mounted at one end upon said support for swinging movement, an arm member rotatably mounted upon said support coaxially with said anvil member for swinging movement therewith, a second anvil member disposed radially in line with said first anvil member and movably carried by said arm member for relative radial movement, yieldable means connected between said first anvil member and said arm member yieldably retaining them in aligned gauging relation and permitting said first and second anvil members to be swung out of radially aligned position, and gauge means carried by said support in contiguous relation to the path of swinging movement of said second anvil member.

3. In a thickness gauge, a support, an article supporting anvil member rotatably mounted at one end upon said support for swinging movement, an arm member rotatably mounted upon said support coaxially with said anvil member for swinging movement therewith, a second anvil member disposed radially relative to said first anvil member and movably carried by said arm member for relative radial movement, cam means carried by said support arranged to effect radial movement of said second anvil member, and gauge means carried by said support in contiguous relation to the path of swinging movement of said second anvil member.

4. In a thickness gauge, a support, an article supporting anvil member rotatably mounted at one end upon said support for swinging movement, an arm member rotatably mounted upon said support coaxially with said anvil member for swinging movement therewith, a second anvil member disposed radially in line with said first anvil member and movably carried by said arm member for relative radial movement, stop means arranged to limit the swinging movement of one of said members to permit the other member to swing out of aligned relation, and gauge means carried by said support in contiguous relation to the path of swinging movement of said second anvil member.

5. In a thickness gauge, a support, an article supporting anvil member rotatably mounted at one end upon said support for swinging movement, an arm member rotatably mounted upon said support coaxially with said anvil member for swinging movement therewith, a second anvil member disposed radially in line with said first anvil member and movably carried by said arm member for relative radial movement, yieldable means connected between said first anvil member and said arm member yieldably retaining them in aligned gauging relation and permitting said first and second anvil members to be swung out of radially aligned position, stop means arranged to limit the swinging movement of one of said members to permit the other member to swing out of aligned relation, and gauge means carried by said support in contiguous relation to the path of swinging movement of said second anvil member.

6. In a thickness gauge, a support, an article supporting anvil member rotatably mounted at one end upon said support for swinging movement, an arm member rotatably mounted upon said support coaxially with said anvil member for swinging movement therewith, a second anvil member disposed radially in line with said first anvil member and movably carried by said arm member for relative radial movement, yieldable means connected between said first anvil member and said arm member yieldably retaining them in aligned gauging relation and permitting said first and second anvil members to be swung out of radially aligned position, stop means arranged to limit the swinging movement of said arm member to permit said first anvil member to have further swinging movement out of aligned relation, cam means carried by said support arranged to affect radial movement of said second anvil member through swinging movement of said arm member, and gauge means carried by said support in contiguous relation to the path of swinging movement of said second anvil member.

7. In a thickness gauge, a support, an arbor shaft mounted on said support, an article supporting anvil member rotatably mounted at one end upon said shaft for swinging movement, an arm member rotatably mounted upon said shaft adjacent said anvil member for swinging movement therewith, a second anvil member disposed radially in line with said first anvil member and movably carried by said arm member for relative radial movement, and gauge means carried by said support in contiguous relation to the path of swinging movement of said second anvil member.

8. In a thickness gauge, a support, an arbor shaft mounted on said support, an article supporting anvil member rotatably mounted at one end upon said shaft for swinging movement, an arm member rotatably mounted upon said shaft adjacent said anvil member for swinging movement therewith, a lift rod carried by said arm member for relative radial movement, a second anvil member carried upon the outer end of said lift rod disposed radially in line with said first anvil member, cam means mounted on said shaft arranged to engage the inner end of said lift rod to affect radial movement thereof, and gauge means carried by said support in contiguous relation to the path of swinging movement of said second anvil member.

9. In a thickness gauge, a support, an article supporting anvil member rotatably mounted at one end upon said support for swinging movement, an arm member rotatably mounted upon said support coaxially with said anvil member for swinging movement therewith, a second anvil member disposed radially in line with said first anvil member and movably carried by said arm member for relative radial movement, and circumferentially spaced gauge elements adjustably carried by said support in contiguous relation to the path of swinging movement of said second anvil member, one of said gauge elements being out of the path of said upper anvil member in a predetermined position of projection of said upper anvil member and the other of said gauge elements being disposed in said path of swinging movement in said predetermined position of projection.

10. In a thickness gauge, a support, an arbor shaft mounted on said support, an article supporting anvil member rotatably mounted at one end upon said shaft for swinging movement and having an axis radially of said shaft, an arm member rotatably mounted upon said shaft adjacent said anvil member for swinging movement therewith, a second anvil member disposed radially in line with said first anvil member and movably carried by said arm member for relative radial movement, and circumferentially spaced gauge elements carried by said support in contiguous relation to the path of swinging movement of said upper anvil member having their axes radial to said shaft, one of said gauge elements being out of the path of said upper anvil member in a predetermined position of projection of said upper anvil member and the other of said gauge elements being disposed in said path of swinging movement in said predetermined position of projection.

11. In a thickness gauge for cartridge cases, a support, a cartridge case supporting lower anvil member rotatably mounted at its lower end upon said support for swinging movement, an arm member rotatably mounted upon said support coaxially with said lower anvil member for swinging movement therewith, an upper anvil member disposed radially in line with said lower anvil member and movably carried by said arm member for relative radial movement to engage outwardly with the end of a cartridge case supported on said lower anvil member, and circumferentially spaced gauge elements adjustably carried by said support in contiguous relation to the path of swinging movement of said upper anvil member, one of said gauge elements being out of the path of said upper anvil member in a predetermined position of projection of said upper anvil member and the other of said gauge elements being disposed in said path of swinging movement in said predetermined position of projection.

12. In a thickness gauge; a support; gauge means carried by said support; an article supporting anvil member having an axis; an arm member; a second anvil member movably mounted on said arm member, said second anvil member being movable relative to said first-mentioned anvil member along the axis of said article supporting anvil member; means for mounting said article supporting anvil member and said arm member on said support for to and fro movement relative to said gauge means; and interconnecting means between said article supporting anvil member and said arm member to give free movement to said second anvil relative to said article supporting anvil member as the members are moved away from the gauge means.

FRANCIS G. DU PONT.
LUTHER V. BARKER.